United States Patent
Taylor et al.

(10) Patent No.: US 6,823,349 B1
(45) Date of Patent: Nov. 23, 2004

(54) METHOD AND SYSTEM FOR ESTABLISHING, MAINTAINING, AND USING A PERSISTENT FRACTURE LOG

(75) Inventors: Alan Lee Taylor, Apex, NC (US); Christopher Adam Norris, Westborough, MA (US); William Paul Hotle, Apex, NC (US); Kenneth John Hayman, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 381 days.

(21) Appl. No.: 09/960,713

(22) Filed: Sep. 21, 2001

(51) Int. Cl.[7] ............................................. G06F 12/00
(52) U.S. Cl. .................. 707/204; 707/201; 707/202; 707/203; 707/204; 707/205
(58) Field of Search ............................. 707/201, 202, 707/203, 204, 205

(56) References Cited

U.S. PATENT DOCUMENTS

| | | | | |
|---|---|---|---|---|
| 5,459,857 A | * | 10/1995 | Ludlam et al. ................. 714/6 |
| 5,546,536 A | * | 8/1996 | Davis et al. .................. 714/20 |
| 5,742,792 A | * | 4/1998 | Yanai et al. ................. 711/162 |
| 6,044,444 A | * | 3/2000 | Ofek .......................... 711/162 |
| 6,173,377 B1 | * | 1/2001 | Yanai et al. ................. 711/162 |
| 6,205,449 B1 | * | 3/2001 | Rastogi et al. .............. 707/202 |
| 6,260,125 B1 | * | 7/2001 | McDowell ................... 711/162 |

* cited by examiner

*Primary Examiner*—Wayne Amsbury
*Assistant Examiner*—Cindy Nguyen
(74) *Attorney, Agent, or Firm*—A. José Cortina; Daniels Daniels & Verdonik, P.A.

(57) ABSTRACT

A method and system for synchronizing a plurality of data images in a computer system, includes a primary image and at least one secondary image which are synchronized. A host computer issues write requests to a primary image site which is also transmitted to a secondary image site. Writing to the primary image and the secondary image at the primary image site and secondary site is conducted simultaneously. If a failure to write to the secondary image occurs, a fracture log is created which is a bitmap representative of changed regions in the primary image at the primary image site in response to the write request. When writing to the secondary image is restored, the log can be used to synchronize the primary image and the secondary image.

21 Claims, 11 Drawing Sheets

METHOD AND SYSTEM FOR ESTABLISHING, MAINTAINING, AND USING A PERSISTENT FRACTURE LOG

CROSS-REFERENCE TO RELATED APPLICATIONS

This application is related to co-pending U.S. patent application Ser. No. 09/375,860 filed Aug. 17, 1999, which is hereby incorporated by reference herein in its entirety.

BACKGROUND OF THE INVENTION

1. Field of the Invention

The present invention relates generally to computer storage systems, and more particularly to remote mirroring in distributed computer storage systems.

2. Description of the Background

In a common computer system architecture, a host computer is coupled to a network that includes storage devices which provide non-volatile storage for the host computer. This is typically known as a computer storage system. The computer storage system includes, among other things, a number of interconnected storage units, each storage unit includes a number of physical or logical storage media (for example, a disk array). For convenience, a group of one or more physical disks that are logically connected to form a single virtual disk is referred to hereinafter as a "Logical Unit" (LU). Data from the host computer is stored in the computer storage system, and specifically in the various storage units within the computer storage system.

One problem in a computer storage system is data loss or unavailability, for example, caused by maintenance, repair, or outright failure of one or more, storage units. In order to prevent such data loss or unavailability, a copy of the host data is often stored in multiple storage units that are operated at physically separate storage units. For convenience, the practice of storing multiple copies of the host data in physically separate storage units is referred to as "remote mirroring." Remote mirroring permits the host data to be readily retrieved from one of the storage units when the host data at another storage unit is unavailable or destroyed.

Therefore, in order to reduce the possibility of data loss or unavailability in a computer storage system, a "remote mirror" (or simply a "mirror") is established to manage multiple images. Each image consists of one or more LUs, which are referred to hereinafter collectively as a "LU Array Set." It should be noted that the computer storage system may maintain multiple mirrors simultaneously, where each mirror manages a different set of images.

Within a particular mirror, one image on one storage system is designated as a primary image, while each other image on one storage system within the mirror is designated as a secondary image. For convenience, the storage unit that maintains the primary image is referred to hereinafter as the "primary storage unit," while a storage unit that maintains a secondary image is referred to hereinafter as a "secondary storage unit." It should be noted that a storage unit that supports multiple mirrors may operate as the primary storage unit for one mirror and the secondary storage unit for another mirror.

A mirror must provide data availability such that the host data can be readily retrieved from one of the secondary storage units when the host data at the primary storage unit is unavailable or destroyed. In order to do so, it is imperative that all of the secondary images be synchronized with the primary image such that all of the secondary images contain the same information as the primary image. Synchronization of the secondary images is coordinated by the primary storage unit.

Under normal operating conditions, the host, i.e., a server running an operating system and an assortment of programs, writes host data to the primary storage unit. The primary storage unit stores the host data in the primary image and also coordinates all data storage operations for writing a copy of the host data to each secondary storage unit in the mirror and verifying that each secondary storage unit receives and stores the host data in its secondary image.

Today data storage operations for writing the copy of the host data to each secondary storage unit in the mirror can be handled in either a synchronous manner or an asynchronous manner. In conventional synchronous remote mirroring, the primary storage unit ensures that the host data has been successfully written to all secondary storage units in the mirror before sending an acknowledgment to the host, which results in relatively high latency, but ensures that all secondary storage units are updated before informing the host that the write operation is complete. In asynchronous remote mirroring, the primary storage unit sends an acknowledgment message to the host before ensuring that the host data has been successfully written to all secondary storage units in the mirror, which results in relatively low latency, but does not ensure that all secondary storage units are updated before informing the host that the write operation is complete.

In both synchronous and asynchronous remote mirroring, it is possible for a number of failures to occur between receiving a write request from the host and updating the primary image and all of the secondary images. One such failure may involve writing to the primary storage unit, but being unable to write to the secondary storage unit due to an actual hardware or software failure between the primary storage unit and the secondary storage unit. Another possible cause of an inability to write is a failure of the secondary storage unit. If the primary storage unit was in the process of completing one or more write operations at the time of the failure, the primary storage unit may have updated the primary image, but may not have updated any secondary image.

After the failure, it may not be possible for the primary storage unit to determine the status of each secondary image, and specifically whether a particular secondary image matches the primary image. Therefore, the primary storage unit will resynchronize all of the secondary images by copying the primary image block-by-block to each of the secondary storage units.

Unfortunately, copying the entire primary image to all the secondary storage units can take a significant amount of time depending on the image size, the number of secondary storage units, and other factors. It is not uncommon for such a resynchronization to take hours to complete, especially for very large images.

Thus, there is a need for a system and method for quickly resynchronizing primary and secondary images following a failure.

SUMMARY OF THE INVENTION

In one aspect there is provided a method for synchronizing a plurality of data images in a computer system. The plurality of data images include a primary image and at least one secondary image. In accordance with the method, a write request is received from a host computer at a primary image site. A write operation is conducted on the primary image at the primary image site, and attempted on at least one secondary image at at least one secondary image site. If the attempt to write to the at least one secondary image at the at least one secondary image site fails, a fracture log is created at the primary image site, which is representative of changed regions in the primary image at the primary image site, whereby the log can be used to synchronize the primary image and the secondary image once it becomes possible to write to the at least one secondary image.

In a more specific aspect, the fracture log which is maintained only in the event of a failure, is a bitmap of the changed regions that have been affected on at least one LU as a result of the write request. In a yet still more specific aspect, the primary image at the primary image site is updated at the same time that the at least one secondary image is updated at the at least one secondary image site in response to the write request. After the updates are made, specifically in the case of synchronous mirrors, the primary image site communicates to the host that the update to both sites is complete. Yet more specifically, if the write request to the at least one secondary image site fails, the fracture log representative of changed regions is created at the primary image site which is representative of changed regions at the image at the primary image site, and is used to effect writing to the at least one secondary image at the at least one secondary image site when it becomes possible to write to the at least one secondary image, thereby ensuring that the images at the primary image site and the at least one secondary image site are synchronized.

In a yet more specific aspect, sometimes it is possible that the write request may have failed at the primary image site and thus at the secondary image site. In such case, a write intent log which is a bitmap representative of the blocks affected by the write request at the primary storage unit, is created at the primary image site. The write intent log is used to write the blocks identified at the primary image to the secondary image when recovery occurs. Thus, it is possible that the original write did or did not occur at the primary image. The write intent log identifies those blocks so that only those blocks are copied to the secondary image to ensure synchronization, irrespective of whether or not those blocks at the primary image were changed as a result of the original write request. The fracture log is then created at the primary image site when the write is effectuated if there is an additional failure to write to the secondary image.

In another aspect, there is disclosed a computer system for maintaining a plurality of data images therein. The plurality of data images include a primary image and at least one secondary image. The computer system includes non-volatile storage for storing at least the primary image. A network interface serves to access the at least one secondary image. There is logic for creating a fracture log which identifies changed regions in the primary image effected as the result of a write to the primary image, and for creating the fracture log only if a write request to the primary image and the secondary image fails with respect to the secondary image. There is also included a write logic for writing to the primary image and to the at least one secondary image to maintain the primary image and the at least one secondary image synchronized, and for writing to the at least one secondary image based on the contents of the fracture log upon the failure of a write request to the at least one secondary image.

In a more specific alternative aspect, the fracture log is made up of a bitmap of the changed regions that have been effected on at least one disk containing the primary image. The fracture log is maintained at the primary image site in which the primary image is maintained, and the logic is configured for updating the primary image at the primary image site and the at least one secondary image at the at least one secondary image site, and for communicating to a host issuing the write request at the update to the primary image at the primary image site, and the at least one secondary image at the at least one secondary image site is complete, specifically in the case of synchronous mirrors.

Yet more specifically, the write logic is configured for using the fracture log in the event of a failure of a write request to the at least one secondary image, to write the same changes to the at least one secondary image upon the ability to write being restored, as previously written to the primary image, to ensure synchronization between the primary image and the at least one secondary image.

Yet still further, the system includes a write intent log in the primary image for maintaining a bitmap indicative of regions on the primary image possibly affected as a result of write requests in the event of a failure to write. The write logic is further configured for writing the blocks on the primary image identified by the write intent log to the secondary image.

BRIEF DESCRIPTION OF THE DRAWINGS

The foregoing and other advantages of the invention will be appreciated more fully from the following further description thereof with reference to the accompanying drawings wherein.

DETAILED DESCRIPTION

Figure 1:
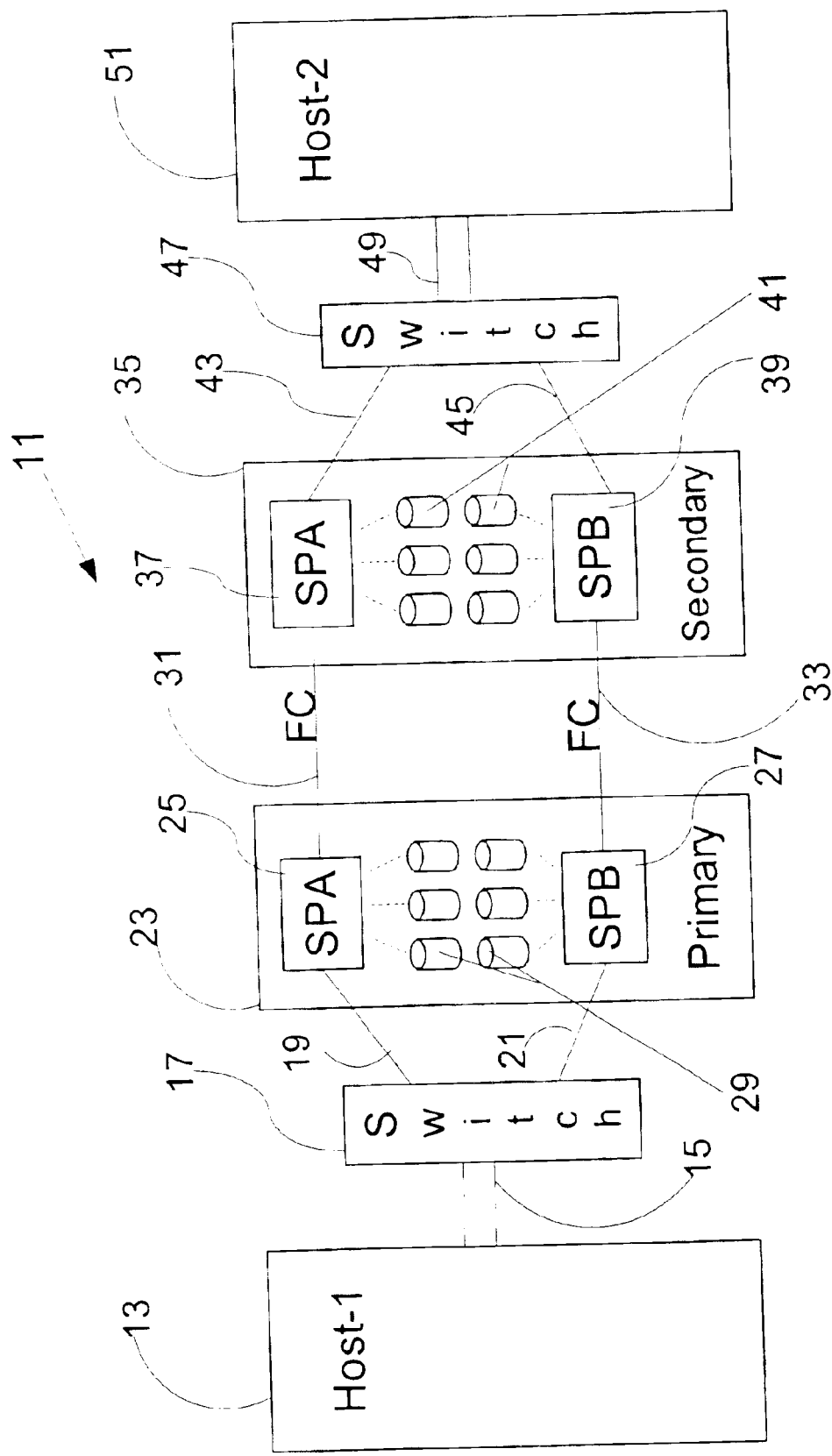
FIG. 1 is a block diagram showing an exemplary computer storage system in accordance with an embodiment discussed herein.

An embodiment described herein enables the primary storage unit to quickly resynchronize secondary images following a failure of both the primary storage unit and secondary storage unit, a link to failure of the secondary storage unit, or a user fracture, by only updating those portions of the secondary images that may be unsynchronized from the corresponding portions of the primary image (i.e., any portions of the secondary images that may differ from the corresponding portions of the primary image). If a failure to write to a secondary image occurs, the primary storage unit creates and maintains what is referred to hereinafter as a "persistent fracture log" which is a bitmap representative of blocks or sections of the primary image on which changes were made as a result of a write request. The persistent fracture log is maintained at the primary storage unit in such a way that it is guaranteed to survive a failure to write to a secondary image on secondary storage unit data being written to a primary image on the primary storage unit. As noted, the persistent fracture log is a bitmap identifying the regions of the primary image on which changes were made, so that when writing to the secondary image is re-enabled, only the data written to the primary image, identified by the persistent fracture log, needs to be written to ensure synchronization between the primary image and the secondary image. By resynchronizing only those portions of the secondary images that may have been unsynchronized, the primary storage unit is able to resynchronize the secondary images accurately and in significantly less time (perhaps seconds rather than hours) than it would have taken to copy the entire primary image block-by-block to each of the secondary storage units. As noted, the bitmap data identifies the blocks on the primary image which have changed to allow such copying.

In a preferred embodiment of the present invention, the primary storage unit maintains the persistent fracture log in a high-speed memory (referred to hereinafter as the "write cache") during normal operation of the mirror. This allows the primary storage unit to quickly add bits representing writes to the primary image and storage device to the persistent fracture log. If the primary storage unit includes redundant storage processors (described in detail below), then each storage processor maintains its own persistent fracture log that is replicated on the peer storage processor. This allows one storage processor to take over for the other storage processor when a storage processor (but not the entire primary storage unit) fails. In case of a complete primary storage unit failure, the primary storage unit includes automatic backup/restoral logic that, among other things, automatically stores the entire persistent fracture log in a non-volatile storage (such as a disk) upon detecting the failure and automatically restores the persistent fracture log from the non-volatile storage upon recovery from the failure. The automatic backup/restoral logic is extremely robust, with redundant battery backup and redundant storage capabilities to ensure that the write intent log is recoverable following the failure.

In the system and method described herein, if a storage processor fails, the write operations corresponding to any write entries in the persistent fracture log may be for writes at different points of completion or corresponding to a write that occurred while a secondary image failed, link to secondary image failed, or through what is known interchangeably as a "user" or "software" fracture.

Assuming that the primary storage unit has redundant storage processors, the persistent fracture log maintained by the failed storage processor is replicated on the peer storage processor. Therefore, once, the peer storage processor has taken over for the failed storage processor, the primary storage unit resynchronizes all of the secondary images to the primary image by updating only those portions of the secondary images identified in the persistent fracture log, preferably by copying the corresponding bits representing the blocks from the primary image to the secondary storage units.

In accordance with the system and method described herein, there may also be implemented a write intent log in combination with the persistent fracture log. An implementation of the write intent log is described in U.S. application Ser. No. 09/375,860, incorporated by reference herein, and modified to be used with the persistent fracture log described herein.

If a write intent log is implemented, if the primary storage unit fails, or a secondary storage unit fails, the automatic backup/restoral logic automatically stores the write intent log in the non-volatile, storage. When this occurs, the write operations corresponding to any write entries in the write intent log may be at different points of completion. For example, the primary storage unit may not have updated any image, may have updated the primary image but no secondary image, may have updated the primary image and some of the secondary images, or may have updated the primary image and all of the secondary images for any particular write operation.

Once the primary storage unit is operational following the failure, the automatic backup/restoral logic automatically restores the write intent log from the non-volatile storage. The primary storage unit then resynchronizes all of the secondary images to the primary image by updating only those portions of the secondary images identified in the write intent log for updating from the primary image, preferably by copying the corresponding image blocks from the primary image to the secondary storage units. If a failure to write to the secondary image occurs, then a persistent fracture log is created as discussed above, and used when writing to the secondary image is re-enabled.

FIG. 1 shows an exemplary computer system 11 in accordance with an embodiment described herein. A computer system 11 includes at least one host 13, in this case being shown with two hosts 13 and 15 which may be servers, for example, servers such as are available from Sun Microsystems operating a variety of possible operating systems such as NT, Solaris, and Linux. The servers 13 and 15 are part of a network and are connected through fibre channels 15 and 49 through switches 17, and 47 to a plurality of storage systems. For the sake of simplicity in this disclosure, FIG. 1 is shown with only two storage systems 23 and 35.

Viewing the left side of FIG. 1, the server 13 may be connected through switch 17 through connections 19 and 21 to a storage system 23 which may be a primary storage system for server 13, and which typically will include two storage processors, i.e., Storage Processor A designated by the number 25 and Storage Processor B designated by the number 27. The storage system 23 which is designated as a primary storage system and includes an array of storage disks may be respectively connected via fibre channel connections 31 and 33, designated as FC to a second storage array 35 which includes Storage Processor A designated by the number 37 and Storage Processor B designated by the number 39, and also includes storage disk array 41. For purposes of implementation with the host 13, storage system 35 is a secondary storage array. Similar to the connection from host 13, another host 51 can be connected through fibre channels 49, 47 and connections 43 and 45 to storage processors 37 and 39 of storage system 35. In this case, the arrangement would be reversed and the storage system 35 designated as the secondary storage unit would function as a primary storage unit for host 51, and the primary storage unit 23 would function as the secondary storage unit for host 51. While the system 11 is shown only with two servers 13 and 51 and storage units 23 and 35, it will be appreciated by those of ordinary skill in the art that many more storage units can make up the network. Similarly less or more hosts, i.e., servers, may be deployed throughout, i.e., at least one or more than two, in numerous configurations.

In a more specific arrangement, each of the storage units in the computer storage system, such as the primary storage array unit 23 and the secondary storage array unit 35, and others not shown, in the computer storage system 11, are fault-tolerant RAID (redundant array of independent disks) storage units with redundant management and storage capabilities. Remote mirroring is implemented as an add-on feature of the storage array or unit. Remote mirroring is used for providing disaster recovery, remote backup, and other data integrity solutions, specifically by keeping byte-for-byte copies of an image at multiple geographic locations. Further, by conducting the remote mirroring function on the storage arrays, this offloads the host processing by making the mirroring operation transparent.

Figure 2:
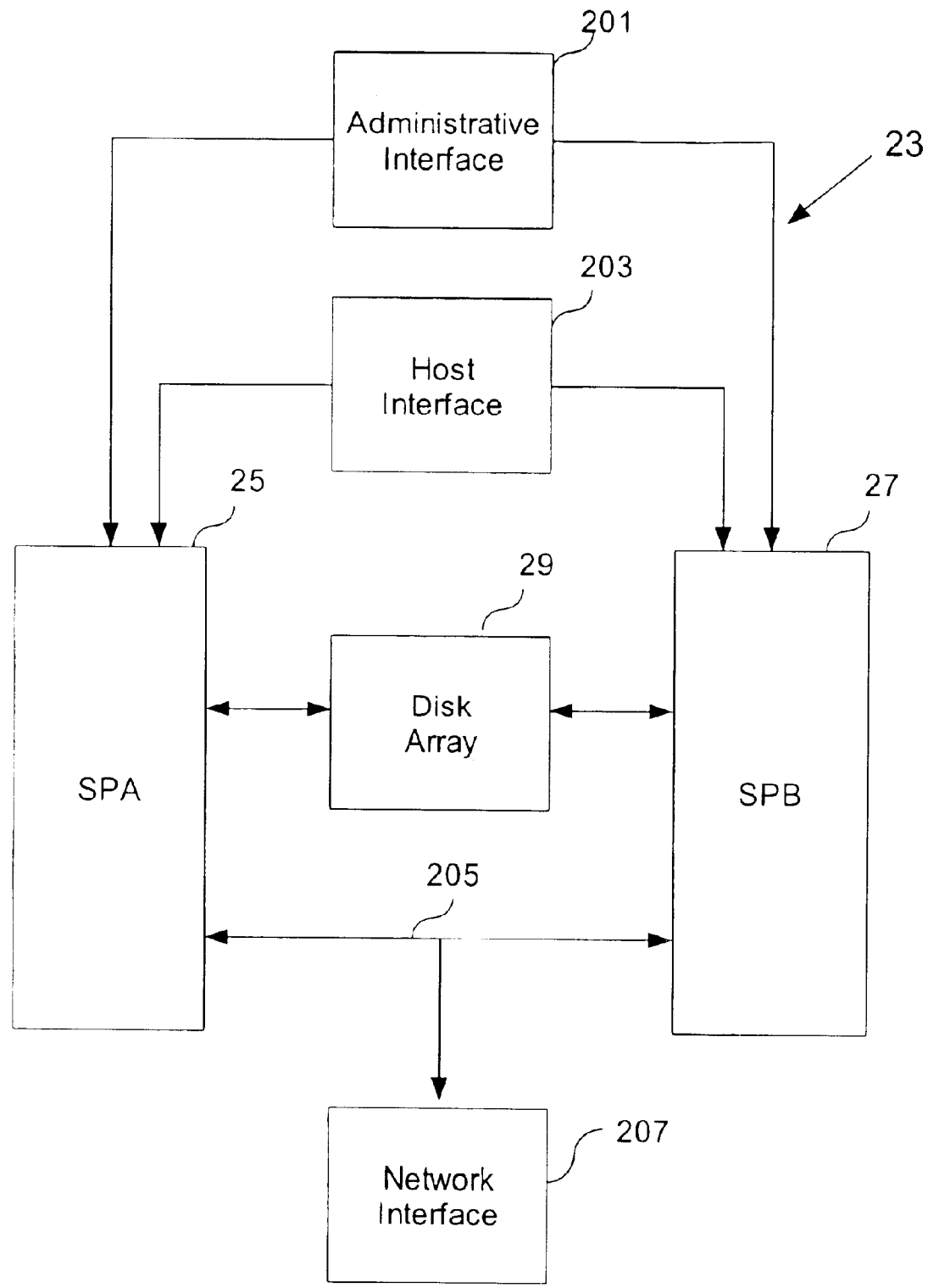
FIG. 2 is a block diagram showing an exemplary storage unit in accordance with an embodiment described herein.

As shown in FIG. 2, a preferred storage unit 23 includes an Administrative Interface 201, at least one host interface 203, at least a first Storage Processor (SP-A) 25 and an optional second storage processor (SP-B) 27, a number of disks arranged as a disk array 29, and a Network Interface 207. The Administrative Interface 201 is preferably an Ethernet interface through which the storage unit 23 is managed and controlled. The host 13 interfaces with the storage unit 23 through the host interface 203, which preferably emulates a SCSI interface. The host interface 203 is coupled to the storage processor (SP-A) 25 and to the optional storage processor (SP-B) 27, such that the host 13 can communicate with both the storage processor (SP-A) 25 and the optional storage processor (SP-B) 27. The storage processor (SP-A) and the optional storage processor (SP-B) 27 are interconnected through an interface 205, which is preferably a fibre channel interface. The storage processor (SP-A) 25 and optional storage processor (SP-B) 27 are also coupled to the Network Interface 207 via the interface 205, which enables each storage processor 25, 27 to communicate with storage processors in other storage units or arrays within the computer system 11.

A preferred storage processor 25, 27 implementation is based upon a multiple processor hardware platform that runs an operating system. All storage processors 25, 27, 37 and 39 run essentially the same software, although the software can differ between the two storage processors, for example, due to a software upgrade of one but not the other storage processor. Therefore, each storage processor is capable of providing full management functions for the respective storage unit or array.

The storage processor software requires each LU to be owned and accessed through one and only one storage processor at a time. This notion of LU ownership is referred to as "assignment." The storage processor software allows each LU in a LU Array Set to be "assigned" to a different storage processor. During normal operation of the storage unit or array, both storage processors process requests and perform various management functions in order to provide redundancy for the storage unit or array. If one of the storage processors fails, the other storage processor takes over management of the LUs for the failed storage processor.

Remote mirroring can be implemented with different storage processors managing different LUs in a LU Array Set (or even with both storage processors sharing access to each LU in the LU Array Set). However, such an implementation would require substantial inter-storage processor coordination for storing information in the LU Array Set. In one implementation of the present invention all LUs in a LU Array Set are "assigned" to the same storage processor, thereby eliminating any inter-storage processor coordination for storing information in the LU Array Set, Thus, each mirror image is managed by one storage processor at a time. For convenience, the storage processor that is primarily responsible for managing a particular mirror image is referred to hereinafter as the "controlling" storage processor, while other storage processor is referred to hereinafter as the "non-controlling" storage processor. For purposes of the following discussion, and with reference again to FIG. 2, the storage processor (SP-A) 25 will be referred to as the "controlling" storage processor, and the storage processor (SP-B) 27 will be referred to as the "non-controlling" storage processor (SP-A) 25.

For ease of reference, storage processors will be referred to hereafter as "SP" and/or "SP-A" and "SP-B", etc.

Figure 3:
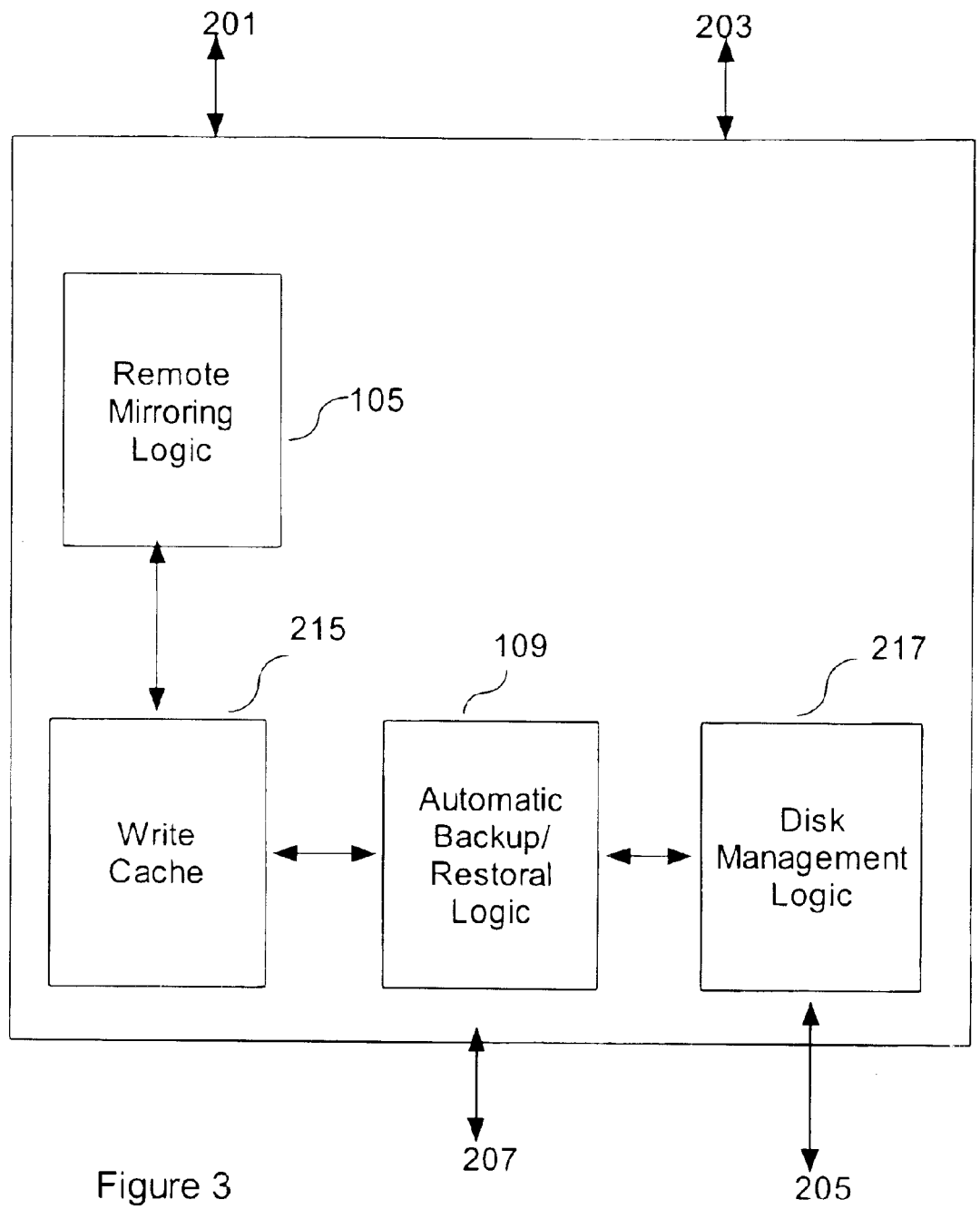
FIG. 3 is a block diagram showing a conceptual view of the relevant logic blocks of a storage processor in accordance with an embodiment described herein.

FIG. 3 shows a conceptual view of the relevant components of an SP, such as the controlling SP-A 25 and the secondary SP-B 27, for operation in the primary storage unit 23. As shown in FIG. 3, the SP includes, among other things, remote mirroring logic 105, write cache 215, automatic backup/restoral logic 109, and disk management logic 217. The disk management logic 217 provides a range of services that permit the various components of the SP, including the remote mirroring logic 105 and the automatic backup/restoral logic 109, to access the disk array 29 and to communicate with other SPs, both within the same storage unit via the interface 205 and across storage units via the interface 205. The remote mirroring logic 105 utilizes services provided by the disk management logic 217 to maintain the primary image in the disk array 29 and communicate with the secondary storage units for coordinating updates or lack of updates of the secondary images. The remote mirroring logic 105 is indirectly coupled to the host interface 203, through which the remote mirroring logic 105 interfaces with the host 13. The remote mirroring logic 105 maintains the write intent log and the persistent fracture log in the write cache 215, which is a local high-speed memory on the SP that is replicated on the peer SP (i.e., the write cache 215 on the SP-A 25 is replicated on the SP-B 27, and the write cache 105 on the SP-B 27 is replicated on the SP-A 25). The automatic backup/restoral logic 109 automatically stores the write cache 215, including the write intent log and the persistent fracture log, in the disk array 29 upon detecting a failure, and restores the write cache 105 from the disk array 29 when the SP recovers from the failure. In a preferred embodiment of the present invention, the remote mirroring logic 105 is implemented as a layered device driver that intercepts and processes information that is sent by the host 13, as described in the related patent application entitled A COMPUTER ARCHITECTURE UTILIZING LAYERED DEVICE DRIVERS, identified as U.S. application Ser. No. 09/375,331 filed Aug. 17, 1999, incorporated by reference herein.

In order to perform remote mirroring, the remote mirroring logic 105 requires a certain amount of persistent storage in the disk array 29. This persistent storage is used by the remote mirroring logic 105 to keep track of certain information (described in detail below), such as mirror state information, mirror membership information, mirror image configuration information, and other information needed to ensure proper operation of the mirror. Because this information is critical to the operation of the storage unit and to the computer storage system as a whole, the information must be easily available, and therefore redundant copies of the information are preferably maintained within the disk array 29 in case of a partial disk array failure.

As noted above, a LU Array Set is composed of one or more LUs. The ability to treat a group of LUs as a single entity simplifies the host administrator's task of managing a remote mirror for a host volume aggregated from one or more LUs. Remote mirroring uses this abstraction to preserve the ordering of all write requests between logically connected LUs when updating secondary images. When using asynchronous mirroring, this ordering can be very important for database engines that spread tables and views across what it sees as multiple devices for performance and locality reasons.

Each LU Array Set within a mirror, whether it is composed of a single LU or multiple LUs, must be of the exact same physical size. This is because the primary storage unit does a block-for-block forwarding of every write request it receives from the host system. If each image is constructed from a single LU, then each LU must be of the same physical size. If each image is constructed from multiple LUs, then the corresponding LUs between a primary storage unit and its secondary storage units must be the same physical size. For example, if the primary image is composed of LUs A and B of sizes 8 Gb and 4 Gb, respectively, then each secondary image must be composed of two LUs A' and B' of sizes 8 Gb and 4Gb, respectively.

While the physical size of a LU Array Set must be consistent between images of the mirror, the RAID level of the LUs within each LU Array Set may be different. The RAID level of a LU determines a number of LU attributes, such as the manner in which information is stored in the LU, the amount of time it takes to store the information in the LU, and the amount of information that can be recovered from the LU in case of a LU failure. A preferred storage unit supports RAID levels 0, 1, 1/0, 3, and 5, which are well-known in the art Among the various RAID levels, RAID level 5 provides the highest level of information recovery in case of a LU failure, but takes the most time to store the information in the LU. RAID level 0 provides the lowest level of information recovery in case of a LU failure, but takes the least amount of time to store the information in the LU. Each LU can be assigned a different RAID level.

In one embodiment, the LUs associated with the primary image are configured for RAID level 5, while the LUs associated with the secondary image(s) are configured for RAID level 0. Using RAID level 5 for the primary image makes the primary image extremely robust. Using RAID level 0 for the secondary image(s) allows each secondary image to be written into its respective secondary storage unit relatively quickly, which can reduce latency, particularly in synchronous remote mirroring.

The remote mirroring functionality can be described with reference to the operational states of a mirror in conjunction with the operational relationships between the primary image and the secondary image(s).

Figure 4:
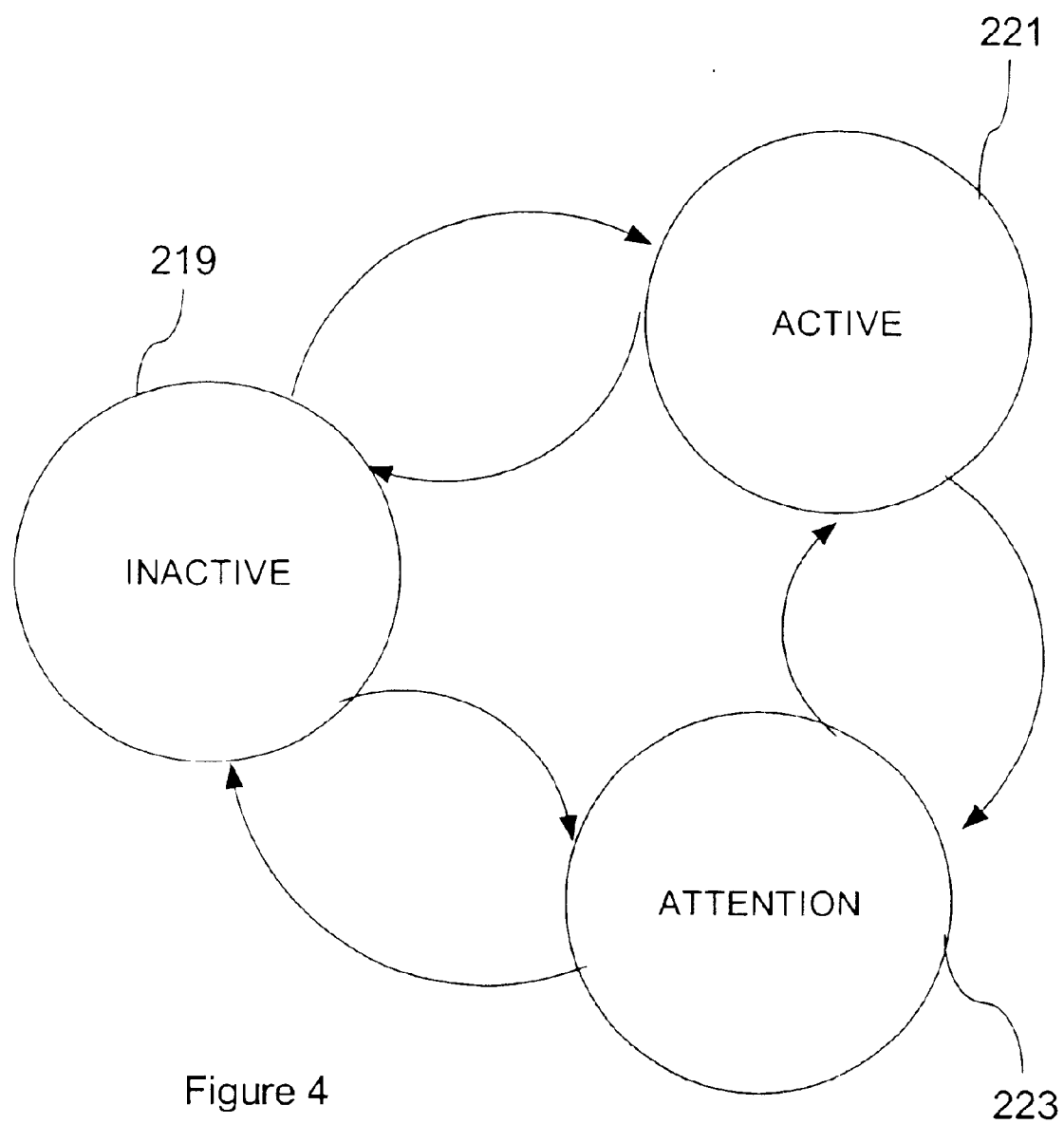
FIG. 4 is a state diagram showing the three primary states of a mirror in accordance with an embodiment described herein.

FIG. 4 is a state diagram showing the operational states of a mirror. For convenience, the state diagram shown in FIG. 4 does not show certain failure transitions and/or failure states. As shown in FIG. 4, there are three primary states for a mirror, namely INACTIVE 219, ACTIVE 221, and ATTENTION 223. The primary distinction between the three states is the way in which the mirror responds to read and write requests from the host.

The default mirror state is the ACTIVE state 221. In the INACTIVE state 219, the host is not permitted to access the primary image. Thus, the host cannot read from the primary image or write to the primary image. The mirror defaults to the ACTIVE 221 when the mirror is created.

When the mirror is in the INACTIVE state 219, the administrator can attempt to activate the mirror. If the administrator attempts to activate the mirror and the mirror meets all minimum requirements for normal operation, then the mirror transitions into the ACTIVE state 221. However, if the administrator attempts to activate the mirror but the mirror fails to meet all minimum conditions for normal operation, the mirror transitions into the ATTENTION state 223.

The normal operating mirror state is the ACTIVE state 221. In the ACTIVE state 221, the host is permitted to access the primary image. Thus, the host can read from the primary image and write to the primary image. If at any time the mirror fails to meet all minimum conditions for normal operation, the mirror automatically transitions into the ATTENTION state 223. The mirror transitions into the INACTIVE state 219 under direct administrative control.

The ATTENTION state 223 indicates that there is a problem somewhere within the mirror that is preventing the mirror from operating normally. The administrator can select whether to go from ATTENTION 223 to ACTIVE 221, or from ATTENTION 223 to INACTIVE 219, depending on the "activation policy." If the activation policy is manual, then the transition is from ATTENTION 223 to INACTIVE 221. If the activation policy is automatic, then the transition is from ATTENTION 223 to ACTIVE 221.

Figure 5:
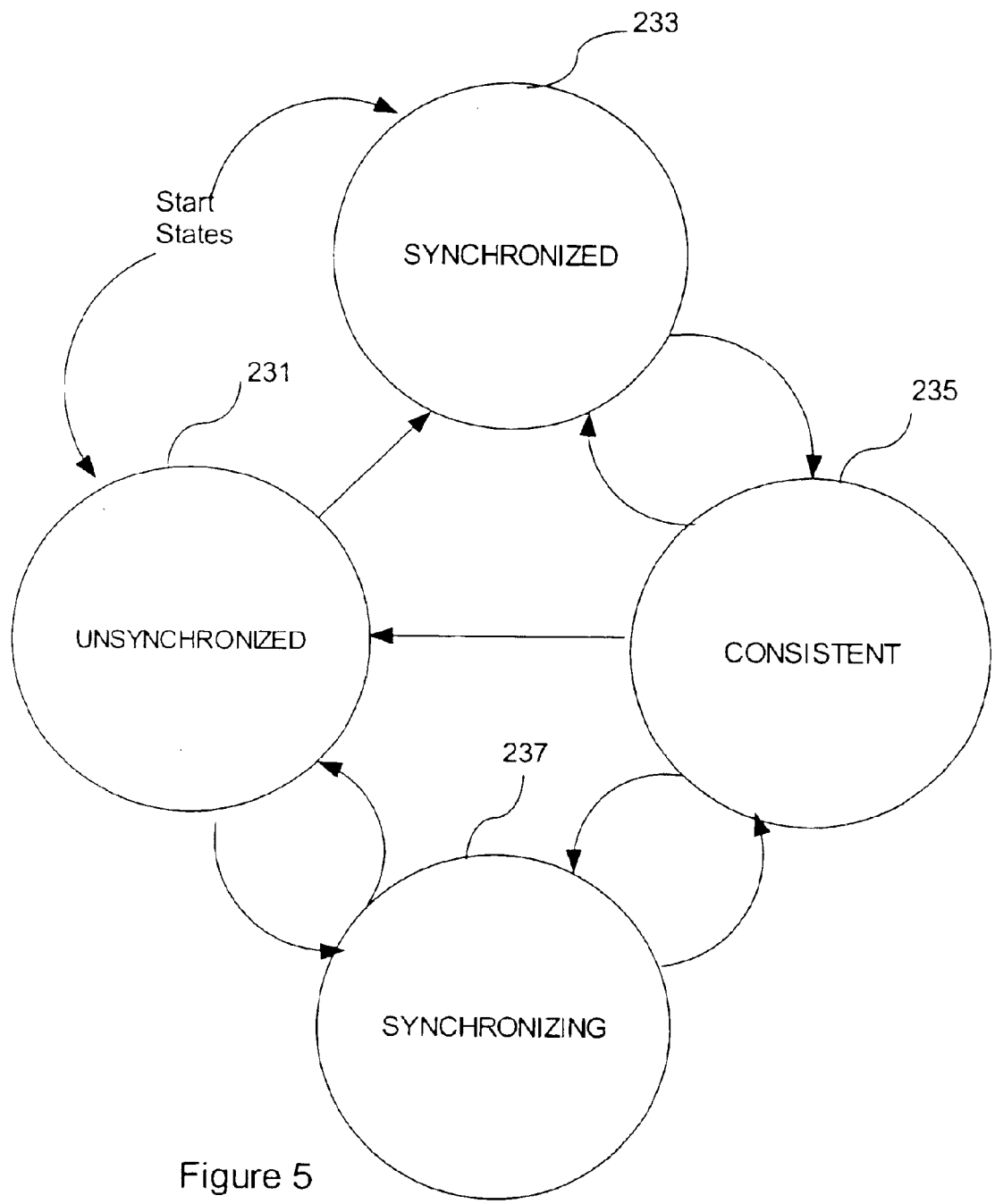
FIG. 5 is a state diagram showing the four primary states of a remote mirror image in accordance with an embodiment described herein.

FIG. 5 is a state diagram showing the operational relationships between the primary image and a single secondary image from the perspective of the secondary image. It should be noted that different secondary images may be in different states relative to the primary image, and therefore the data contained in various secondary images may differ. As shown in FIG. 5, there are four primary states, namely UNSYNCHRONIZED 231, SYNCHRONIZED 233, CONSISTENT 235, and SYNCHRONIZING 237.

A secondary image is considered to be in the UNSYCHRONIZED state 231 when no known relationship between the data in the secondary image and the data in the primary image can be readily determined. This is the case, for example, when the secondary image is first added to the mirror.

From the UNSYNCHRONIZED state 231, the secondary image transitions into the SYNCHRONIZING state 237 if and when the mirror is in the ACTIVE state 221. This is an implicit action taken by the remote mirroring software in the secondary storage unit.

Specifically, the administrator can explicitly synchronize the secondary image with the primary image by placing the mirror in the ACTIVE state 221, copying the primary image to the secondary image or otherwise creating the secondary image to be identical to the primary image, and explicitly marking the secondary image as being in the SYNCHRONIZED state 233.

A secondary image is considered to be in the SYNCHRONIZED state 233 when the secondary image is an exact byte-for-byte duplicate of the primary image. This implies that there are no outstanding write requests from the host that have not been committed to stable storage on both the primary image and the secondary image.

From the SYNCHRONIZED state 233, the secondary image transitions into the CONSISTENT state 235 when the mirror is in the ACTIVE state 221 and the primary image commits a write request into its stable storage. At that point, the secondary image is no longer an exact byte-for-byte duplicate of the primary image, although the secondary image is still consistent with the previous state of the primary image.

A secondary image, is considered to be in the CONSISTENT state 235 if it is not currently an exact byte-for-byte duplicate of the primary image but is a byte-for-byte duplicate of the primary image at some determinable point in the past or present.

From the CONSISTENT state 235, the secondary image transitions into the SYNCHRONIZED state 233 if the mirror is in the ACTIVE state 221 and both the primary image and the secondary image have committed all write requests to stable storage (i.e., there are no outstanding write requests. This transition is made under the control of the primary image.

Also from the CONSISTENT state 235, the secondary image transitions into the SYNCHRONIZING state 237 when either (1) the mirror is in the INACTIVE state 219 and the administrator explicitly forces the secondary image into the SYNCHRONIZING state 237, or (2) the mirror is in the ACTIVE state 221 and the secondary image determines that one or more write updates from the primary image have been lost in transit.

Also, from the CONSISTENT state 235, the secondary image transitions into the UNSYNCHRONIZED state 231 if the mirror is in the ACTIVE state 221 and the write history maintained by the primary storage unit is corrupted or lost.

A secondary image is considered to be in the SYNCHRONIZING state 237 if it is being explicitly updated from the primary image in a manner that is not the direct consequence of a host write to the primary image. It should be noted that the actual synchronizing operation may require a full byte-for-byte copy of the primary image or only the transmission (or retransmission) of a series of write requests.

From the SYNCHRONIZING state 237, the secondary image transitions to the UNSYNCHRONIZED state 233 if, for any reason, the secondary image fails to be synchronized with the primary image. In this case, an attempt may be made to synchronize the secondary image, although such synchronization may be impossible in certain situations, for example, due to lost communication to the secondary image.

Also from the SYNCHRONIZING state 237, the secondary image transitions to the CONSISTENT state 235 upon successful completion of the synchronization operation, regardless of the method used to synchronize the secondary image.

It should be noted that the secondary synchronization operations are completed transparently to the host. In order to prevent secondary synchronization operations from affecting normal access to the mirror by the host, a throttling mechanism is used to limit the number of transactions between the primary image and the secondary image.

As described above, the host is only permitted to access the mirror through the primary storage unit. Therefore, the remote mirroring driver prevents certain accesses to LUs associated with the mirror, specifically by intercepting certain requests that are received from higher level drivers, In order to intercept requests, each storage unit maintains a LU List identifying all of the storage unit LUs that are associated with the mirror. The remote mirroring driver in each secondary storage unit intercepts any read or write request from a higher level driver that is targeted for a LU in the LU List and denies access to the LU, specifically by preventing the request from being processed by the lower level driver(s). Similarly, the remote mirroring driver in the primary storage unit intercepts any write request from a higher level driver that is targeted for a LU in the LU List in order to perform the appropriate remote mirror functions. However, the remote mirroring driver in the primary storage unit allows all read requests from higher level drivers to be processed by the lower level driver(s).

Each storage unit that participates in a mirror maintains a complete copy of a mirror database in its persistent storage. As mirror-related information changes, each storage unit updates its mirror database so that all participants have, the same view of the mirror. This update across all mirror members is done in "atomic" fashion (i.e., the update across all mirror members is treated as a single operation that must be completed by all mirror members). By keeping this information local to each storage unit, the role of the primary image can be assumed by any image in the mirror as directed by the administrator.

The information stored within the mirror database serves two purposes. The first is to provide persistent storage of each mirror's attributes. The second is to assist during failover conditions by maintaining the mirror's state information. The information in the mirror database is modified indirectly via administrator operations and/or directly via operational use of the mirror. The minimum amount of information required to meet the above purposes is maintained in the mirror database.

The information maintained for a particular mirror in the mirror database can be categorized as mirror-wide information and image-specific information.

In a preferred embodiment of the present invention, the mirror-wide information includes, among other things, a mirror name, a mirror state, a fracture log size parameter, a mirror extent size parameter, a minimum images required parameter, a synchronization priority parameter, a write policy parameter, and a write backlog size parameter.

The mirror name is a symbolic name for the mirror. The mirror name is provided by the administrator when the mirror is created. The mirror name is maintained as a text string field within the mirror database.

The mirror state indicates whether the mirror is in the INACTIVE state 219, the ACTIVE state 221, or the ATTENTION state 223. The mirror state is updated dynamically by the remote mirroring software.

The fracture log size parameter (a fixed size) specifies the size of each fracture log in units of mirror extent size. The extent size is not user changeable. It is set by the RM driver 105 discussed hereafter. The fracture log extent size determines the size of the disk that is marked dirty when one byte in a region changes.

The maximum missing images parameter sets the maximum number of images that are allowed to be missing from the mirror while allowing the mirror to remain active. When this limit is reached, the mirror cannot be activated if it is in the INACTIVE state 219, or is placed in the ATTENTION state 223 if the mirror is in the ACTIVE state 221. A value of zero requires that all secondary images be present in order for the mirror to be active, a value of negative one is used to disable this feature.

The minimum images required parameter sets the minimum number of images that must be available before the mirror can be activated. Setting this value equal to the total number of images in the mirror requires that all images be present before the mirror can be activated. A value of negative one is used to disable this feature.

The write policy parameter specifies whether the mirror is synchronous or asynchronous.

The write backlog size parameter sets the amount, in blocks, of host writes that can be queued an the primary for subsequent delivery to the secondary storage unit(s). The write backlog size parameter is only used for asynchronous remote mirroring.

In a preferred embodiment of the present invention, the image-specific information includes, among other things, an SP identifier, a LU Array Set identifier, an image designator, a mirror image state, a cookie, a synchronization rate parameter, a synchronization progress indicator, and a recovery policy parameter.

The SP identifier uniquely identifies the primary SP and, if available, the secondary SP for the image.

The LU Array Set identifier identifies the one or more constituent LUs for the image.

The image designator specifies whether the image is a primary image or a secondary image.

The mirror image state indicates whether the image is in the UNSYNCHRONIZED state 231, the SYNCHRONIZED state 233, the CONSISTENT state 235, or the SYNCHRONIZING state 237.

The cookie is a dynamically updated value that contains consistency information that relates the state of the image to the state of the mirror.

The synchronization rate parameter indicates the rate at which image synchronizations are done, which is the mechanism by which synchronizations are throttled.

The synchronization progress indicator is used to maintain the status of a secondary image synchronization. This value is consulted when an unreachable secondary that had been undergoing synchronization becomes reachable.

The recovery policy parameter specifies whether or not the image should be automatically resynchronized when the image comes online.

In a preferred embodiment of the present invention, remote Mirrors and their corresponding images are managed through a set of administrative operations. These administrative operations change certain characteristics or behavior of the entire mirror. Image operations are intended for a specific image of the mirror. In particular, some image operations are intended for the primary image, while other operations are intended for a particular secondary image.

Unless otherwise indicated, an administrative operation must be sent to the primary storage unit, which in turn propagates the operation to the appropriate secondary storage unit(s) as needed, specifically using a Message Passing Service (MPS) as described in the related application Ser. No. 09/376,173 entitled SYSTEM, DEVICE, AND METHOD FOR INTERPROCESSOR COMMUNICATION IN A COMPUTER SYSTEM, which is incorporated by reference herein. The primary storage unit maintains status information for each secondary storage unit in the mirror, specifically whether or not the secondary storage unit is REACHABLE or UNREACHABLE (i.e., whether or not the primary storage unit is able to communicate with the secondary storage unit). If the primary storage unit attempts to propagate mirror configuration information to a secondary storage unit and the secondary storage unit fails to acknowledge receipt of the mirror configuration information, then the primary storage unit marks the secondary storage unit as UNREACHABLE and propagates new mirror configuration information to the remaining secondary storage units in the mirror.

The remote mirroring software must be notified of any configuration changes that affect the operation of mirrors. Such configuration changes are not mirror operations per se, but require notification to the mirroring software in order to ensure proper mirror behavior. For example, the remote mirroring software in each SP must be notified when an LU is reassigned from one SP to the other SP so that the SPs can coordinate any mirror-related recovery caused by the transition.

In order to create a mirror, the, administrator first creates a LU Array Set on the primary storage unit and configures the LU Array Set to operate as a primary image. The administrator than invokes a CREATE MIRROR function in the primary storage unit, specifying the LU Array Set and a mirror name. The CREATE MIRROR function initializes mirror configuration information and adds the LU Array Set to the LU List maintained by the primary storage unit. If the LU Array Set does not exist or the LU Array Set is part of another mirror, then the CREATE MIRROR function fails to create the mirror. However, assuming that the CREATE, MIRROR function completes successfully, then the mirror consists of a single (primary) image, and is in the ACTIVE state 221.

Once a mirror is created, the administrator can add a secondary image to the mirror, remove a secondary image from the mirror, promote a secondary image to operate as the primary image, synchronize a secondary image, fracture a secondary image, restore the fractured secondary image, activate the mirror, deactivate the mirror, or destroy the mirror. The administrator can also change mirror attributes or retrieve mirror attributes.

In order to add a secondary image to the mirror, the administrator first creates a LU Array Set on the secondary storage unit and configures the LU Array Set to operate as a secondary image. The administrator then instructs the primary storage unit to add the secondary image to the mirror. The primary storage unit in turn instructs the secondary storage unit to add the secondary image to the mirror. The secondary storage unit may reject the request, for example, if the secondary image is already in the mirror, the LU Array Set does not exist, or the LU Array Set is part of another mirror. However, assuming that the secondary storage unit adds the secondary image to the mirror, then the primary storage unit updates its mirror configuration information to include the secondary image, and the primary storage unit distributes the new mirror configuration information to all secondary storage units.

It should be noted that the secondary image can be added to the mirror in either the SYNCHRONIZED state 233 or the UNSYNCHRONIZED state 231. Adding the secondary image in the SYNCHRONIZED state 233 avoids any synchronization operations. Adding the secondary image in the UNSYNCHRONIZED state 231 requires synchronization operations to synchronize the secondary image to the primary image. If the mirror is in the INACTIVE state 219 when the unsynchronized secondary image is added to the mirror, then the secondary image, remains in the UNSYNCHRONIZED state 231. If the mirror is in the ACTIVE state 221 when the unsynchronized secondary image is added to the mirror or the mirror is subsequently activated as described below, a synchronization operation is performed to synchronize the secondary image to the primary image.

In order to remove a secondary image from the mirror, the administrator instructs the primary storage unit to remove the secondary image from the mirror. The administrator can request either a graceful removal of the secondary image or a forced removal of the secondary image. If the administrator requests a graceful removal of the secondary image, then all outstanding requests to the secondary image are completed before removing the secondary image from the mirror. If the administrator requests a forced removal of the secondary image, then the secondary image is removed without completing any outstanding requests. In either case, the primary storage instructs the secondary storage unit to remote the secondary image from the mirror. After verifying that the LU Array Set is part of the mirror, the secondary storage unit removes the LU Array Set from the mirror, and removes the LU Array Set from the LU List. As a result, the remote mirroring driver in the secondary storage unit stops intercepting requests that are targeted for the LUs in the LU Array Set. The primary storage unit updates its mirror configuration information to exclude the secondary image, and the primary storage unit distributes the new mirror configuration information to all secondary storage units. It should be noted that removing the secondary image from the mirror does not delete the corresponding LUs or the data contained therein.

In order to promote a secondary image to operate as a primary image, the administrator instructs the secondary image the promote itself. If the secondary image is synchronizing 237 or is unsynchronized 231, then promotion fails.

In order to synchronize a secondary image, the administrator instructs the primary storage unit to synchronize the secondary image. The primary storage unit performs a block-by-block copy of the primary image to the secondary image. This can be done while the mirror is in the ACTIVE state 221, but not in the INACTIVE state 219. Any incoming write requests that are received by the primary storage unit during resynchronization of the secondary image are forwarded to the secondary storage unit if and only if the write request is directed to a portion of the image, that has already been written to the secondary storage unit. A throttling mechanism is used to pace, the synchronization operation in order to prevent the synchronization operation from overloading the communication links between storage units.

In order to activate the mirror, the administrator instructs the primary storage unit to activate the mirror. The primary storage unit updates its mirror configuration information to put the mirror into the ACTIVE state 221, and informs all secondary storage units that the mirror is active. Each secondary storage unit in turn updates its mirror configuration information to put the mirror into the ACTIVE state 221.

In order to remove the mirror, the administrator instructs the Primary storage unit to deactivate the mirror. The administrator can request a forced removal of the mirror. If the administrator requests a forced removal of the mirror no outstanding write requests are completed. The primary storage unit updates its mirror configuration information to put the mirror into the INACTIVE state 219. As a result, the remote mirroring driver in the primary storage-unit stops intercepting write requests that are targeted for the LUs in the LU Array Set. The primary storage unit also informs all secondary storage units that the mirror is inactive. Each secondary storage unit in turn updates its mirror configuration information to put the mirror into the INACTIVE state 219.

In order to change mirror attributes, the administrator sends a request to the primary storage unit. The primary storage unit in turn updates its mirror configuration information and the mirror state (if necessary), and propagates the change request to the secondary storage unit(s). Each secondary storage unit updates its mirror configuration information and mirror state accordingly.

In order to retrieve mirror attributes (specifically, a copy of the mirror attributes for each image in the mirror), the administrator sends a request to any storage unit in the mirror. The receiving storage unit retrieves the mirror attributes for its own image, and also retrieves the mirror attributes for the other images in the mirror from the respective storage units. The receiving storage unit returns a copy of the mirror attributes for each image in the mirror (or a set of error codes for any unretrievable image) to the administrator.

In order to destroy the mirror, the mirror must consist of only the primary image. Thus, in order to destroy the mirror, the administrator first removes all secondary images from the mirror and then deactivates the mirror, as described above. The administrator then instructs the primary storage unit to destroy the mirror. The primary storage unit removes all mirror configuration information associated with the mirror, and removes all LUs associated with the mirror from the LU List. As a result, the remote mirroring driver in the primary storage unit stops intercepting write requests that are targeted for the LUs in the LU Array Set. It should be noted that destroying the mirror does not delete the corresponding LUs or the data contained therein.

Figure 6:
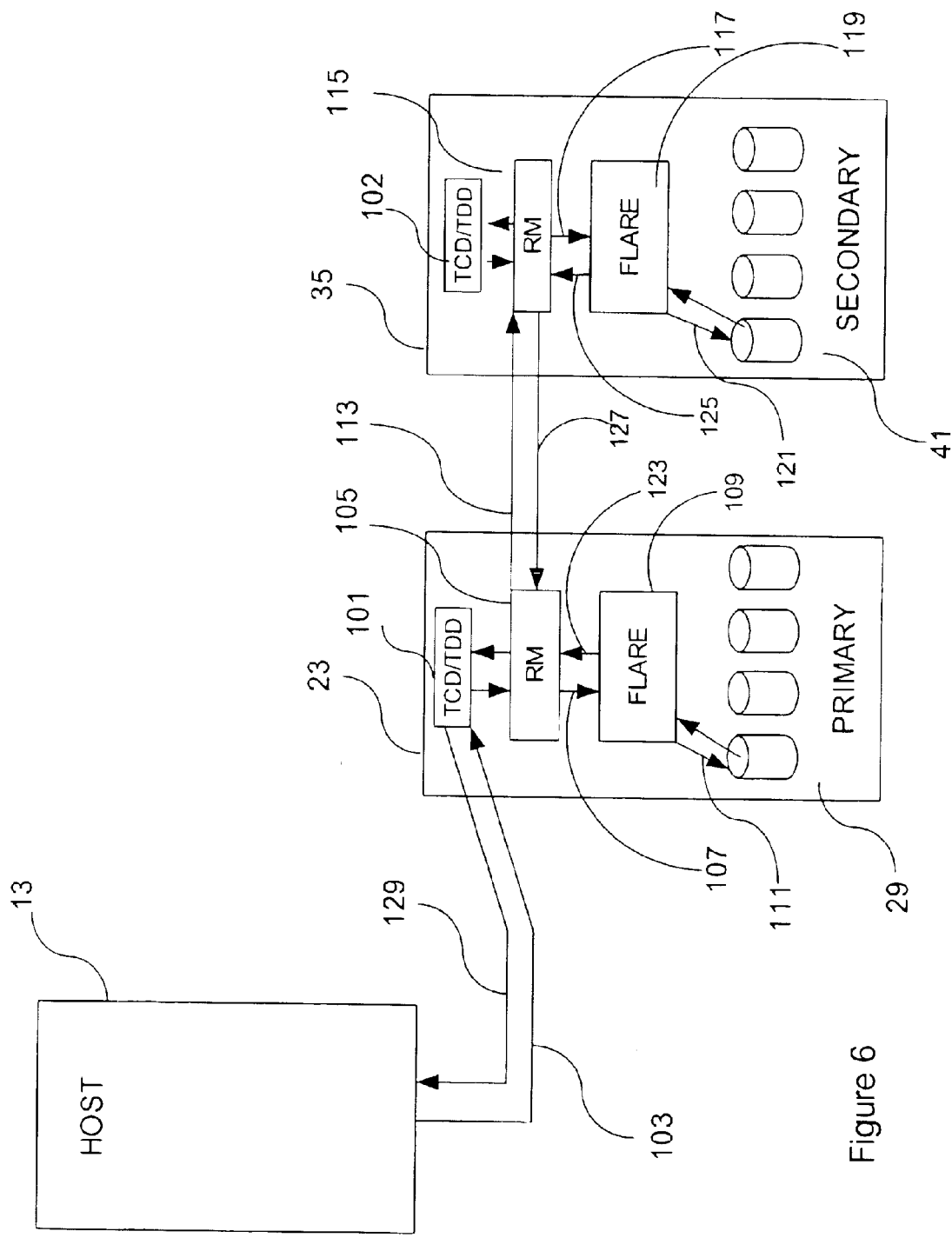
FIG. 6 is a block diagram showing the various instruction paths between the host issuing write requests and a primary image site and a secondary image site.
Figure 7:
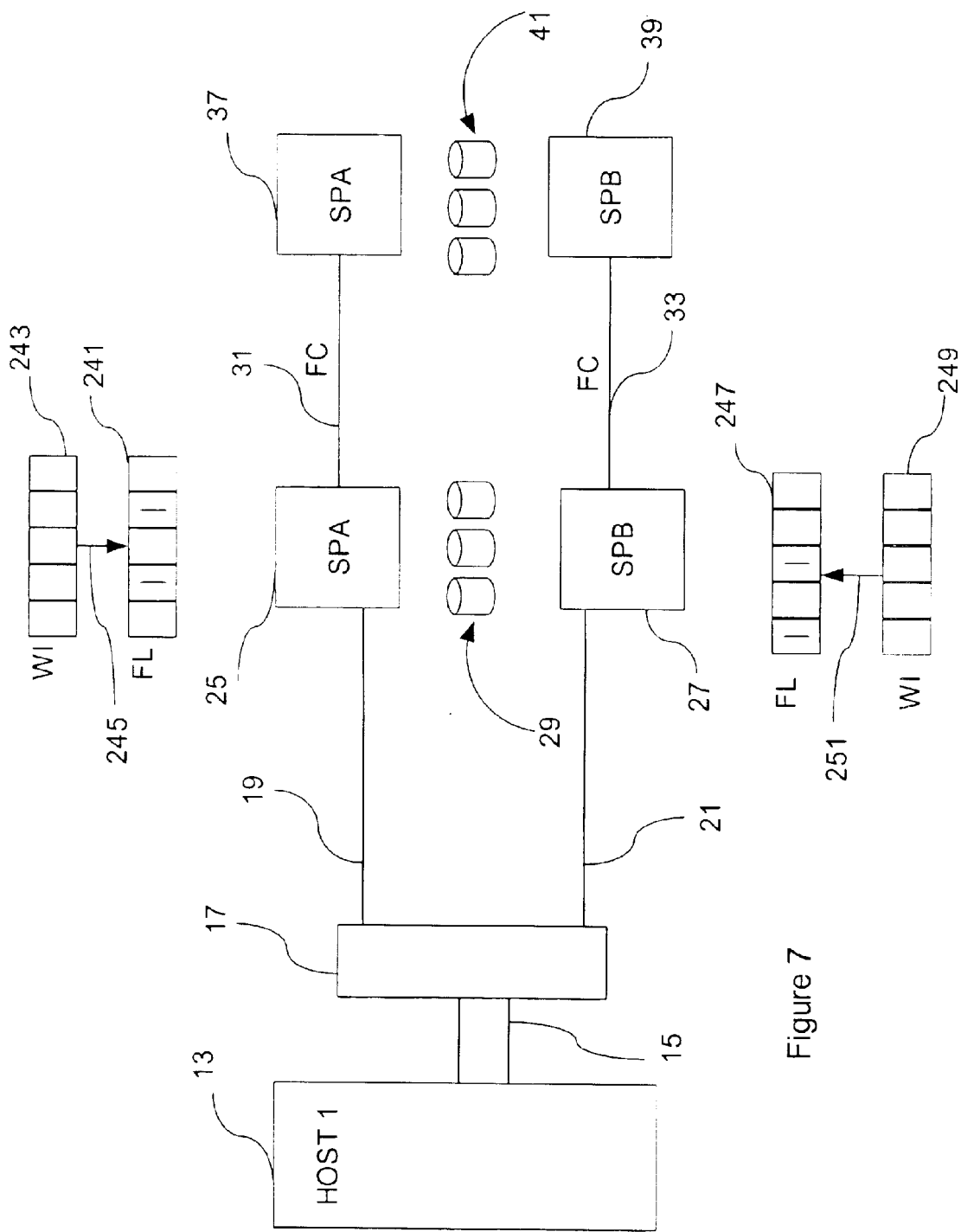
FIG. 7 is a block diagram schematically showing further details of the write requests and communication flow paths of FIG. 6, further illustrating the use of a write intent log and fracture log in accordance with the invention to assure synchronous mirroring.

FIGS. 6 and 7 illustrate in greater detail, in block diagram form, how the persistent fracture log, optionally used with a write intent log, is implemented in accordance with the method and system described herein to ensure that primary and secondary images are maintained synchronized, and thus avoid having to do a full recovery between the primary image and a secondary image in the event of a failure.

In typical operation, as illustrated in FIG. 6, a host 13 is connected to storage units 23 and 35 which include write request drivers 101 and 102 designated TCD/TDD (Target Class Driver and Target Disk Driver), which is conventional and well known to those of ordinary skill in the art. A write request 103 is submitted to the primary storage unit 23 through write request driver 101, and a remote mirror driver 105 to a software module 109 (designated as FLARE), also well known to those of ordinary skill in the art, and which controls the RAID algorithms previously discussed. The remote mirror driver 105 in storage unit 23 also issues a write request 107 through the control software 109 which through the RAID algorithm recognizes logical units (LUs) within the array of storage drives 29 and issues a write 111 to an LU in the array 29. Simultaneously, a write request 113 is issued by write request driver 101 to the secondary storage unit 35 by remote mirror driver 105 through its own remote mirror driver 115, which in turn issues the write request 117 through the control software 119 which is then written 121 at an LU of the array 41. Once the write to the primary and secondary storage units 23 and 35 is accomplished, in synchronous mirroring, acknowledgements 107, 125, 127 and 129 are issued and confirmed to the host that the write request has been executed successfully at both storage units 23 and 35.

FIG. 7 more clearly illustrates in block diagram form how the method and system are implemented, and shows in broken out form the SPs of the respective storage unit 23 and 35. As illustrated in greater detail therein, a host 13 is connected through, for example, a fibre channel connection 115, through a switch 17 and connecting lines 19 and 21 to the storage processors SP-A 25 and SP-B 27 (see prior FIG. 1), which are in turn connected through fibre channel connections 31 and 33 to corresponding storage processors SP-A 37 and SP-B 39 of secondary storage unit 35. Each SP is respectively associated with arrays 29 and 41 contained within the respective storage units.

Thus, when a write request is issued by the host 13, for example, to SP-A 25, the primary and secondary storage units 23 and 35 include software through which the write is effected on an LU of array 29 as well as an LU of array 41. The write request is simultaneously transmitted through connection 31 to SP-A 37. The same methodology applies also for SP-B 27 and SP-B 39 in the event a write request is issued to those SPs. Simultaneously with the write request being issued, a persistent fracture log 241 is established which is a bitmap representative of which storage areas, i.e., blocks of the LU, have been written to.

It will be appreciated by those of ordinary skill in the art that a number of failures can occur at this time which may result in the write not being executed on the secondary storage unit 35. One typical failure which can occur is a disconnection of the cable 31 from the secondary storage unit 35 such that the write request does not reach SP-A 37. Alternatively, SP-A 37 may itself fail, and as such, it is possible that a situation is reached that the mirror secondary storage unit 35 is no longer synchronized with the primary storage unit 23. The purpose of the fracture log 241 is to maintain a record of what writing occurred to the LU in array 29 so that when either the connection 31 is recovered or operation of the secondary storage unit 35 is restored to normal mode, the persistent fracture log tracked to the changes made as a result of the write on the primary storage unit 23 and the blocks changed in the LU of the array 29 are then copied to the array 41 to ensure synchronization of the secondary storage unit 35 with the primary storage unit 23.

It will be appreciated by those of ordinary skill in the art that the persistent fracture log 241 and 247 are not records of the actual changes on the LUs made, but instead are pointers to where the changes were made so that the appropriate block from the LU of the primary storage unit 23 may be copied to an LU of the secondary storage unit 35.

In addition to a failure to write to the secondary storage unit 35, it is possible that the primary storage unit 23 failed, for a number of reasons including a failure of one of the SPs, i.e., SP-A 25 or SP-B 27, and that although a write request has been issued, it has not been effected. This can occur such that the write request does not result in a write at both the primary as well as the secondary storage units 23 and 35, and in the case with related application Ser. No. 09/375,860 a write intent log 243 or 249 is implemented which is a bitmap identifying blocks on the primary image which were instructed to be written to, for which a write request was issued but may or may not have been implemented.

Once the primary storage unit 23 is recovered, the write intent log 243 or 249 can be used to effect the write to an LU in the array 29. The process with respect to the persistent fracture log 241 and 247 simultaneously proceeds as previously described to ensure synchronization with the secondary storage unit 35. Thus, in the event that through implementation of the write intent log 243 or 249 through instructions 245 or 251, that a write is made to an LU in the array 29, but for some reason cannot be effectuated with respect with the secondary storage unit 35, then the persistent fracture logs 241 and 247 have been created and later used to synchronize the secondary storage unit 35 with the primary storage unit 23 once it is recovered.

Figure 8:
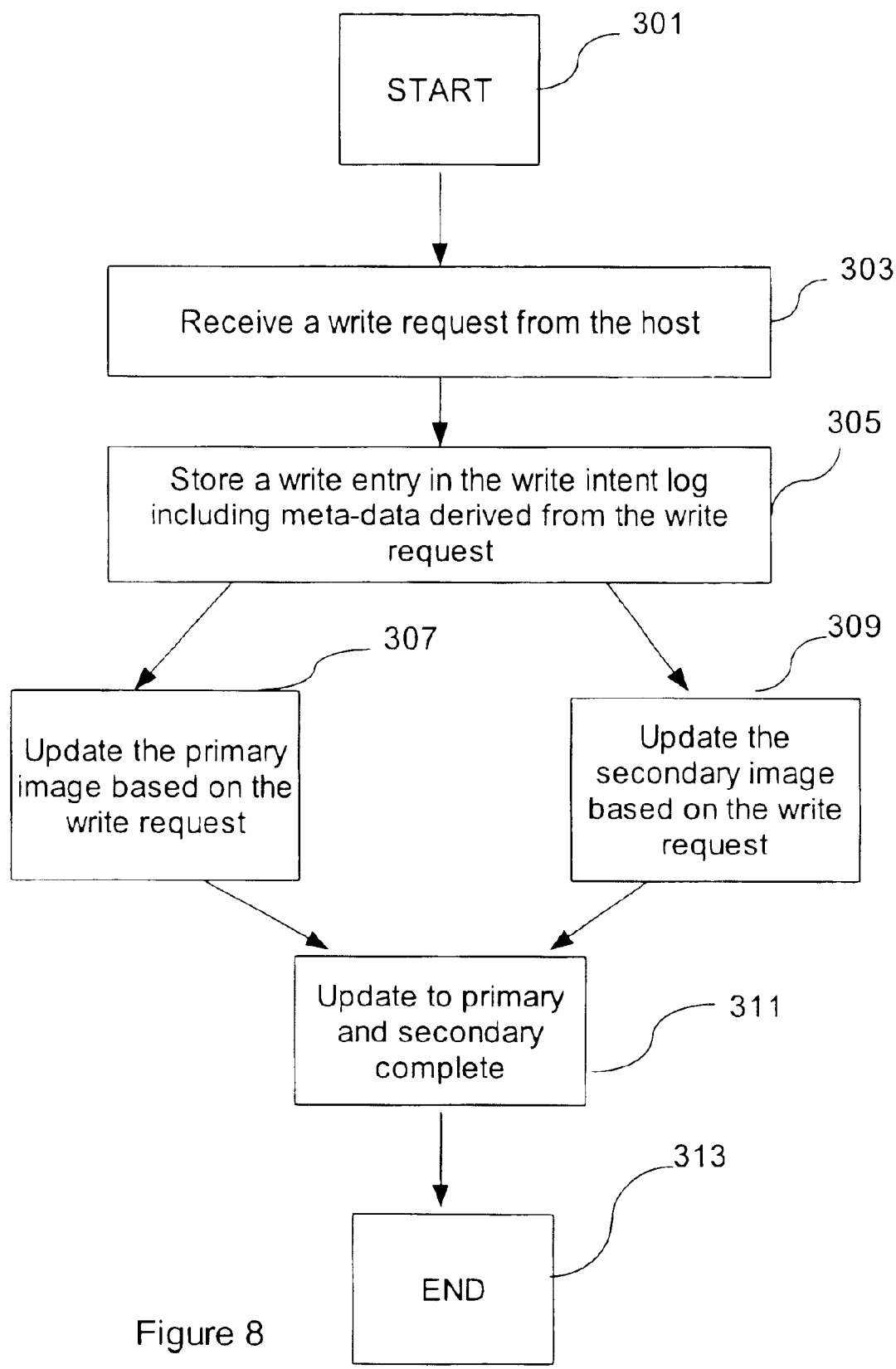
FIG. 8 is a logic flow diagram showing exemplary logic for processing a write request in accordance with the description provided herein.

FIG. 8 is a logic flow diagram showing exemplary remote mirror logic for processing a write request. Beginning in step 301 and upon receiving the write request, in step 303 the remote mirroring logic stores a bitmap representative of blocks possibly affected by the write request including meta-data derived from the write request in step 305. In a preferred embodiment, the meta-data includes a block identifier identifying the image block being updated, although the meta-data may additionally or alternatively include write update information indicating one or more modifications. At steps 307 and 309, updates to the primary image and to the secondary image are made based on the write request. It will be appreciated that the updates to the primary and secondary images are done in parallel. The update to the primary and secondary in synchronous mirrors is completed at step 311 and acknowledged to the host. The remote mirror logic for processing the write request then terminates in step 313.

Figure 9:
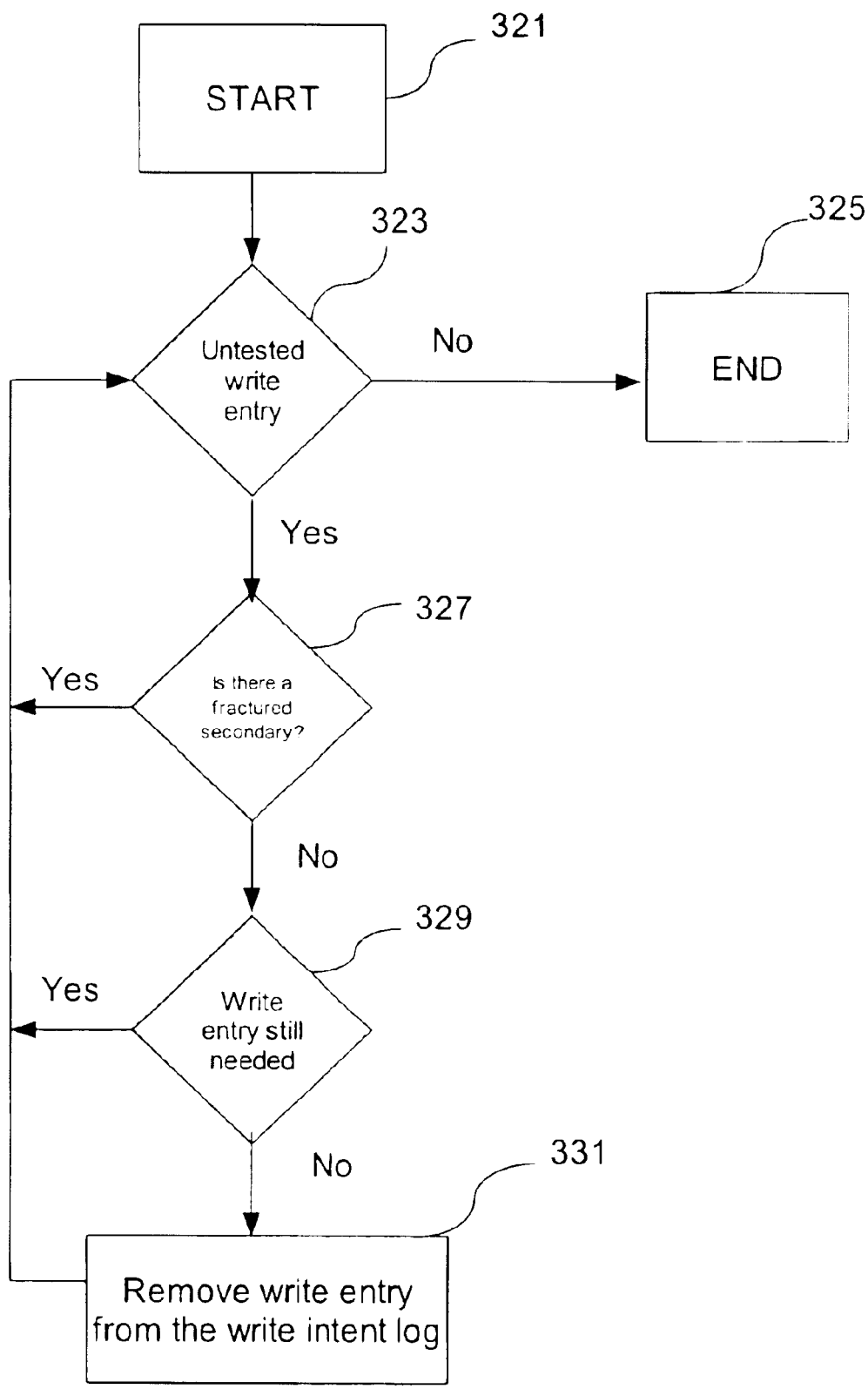
FIG. 9 is a logic flow diagram showing exemplary logic for removing unneeded write entries from a write intent log based on whether there is a fractured secondary image.

FIG. 9 is a logic flow diagram showing exemplary remote mirroring logic removing write entries from the write intent log, particularly using the "lazy" technique. The remote mirroring logic periodically tests the write intent log to determine whether the write entry is still needed, and removes the write entry from the write intent log if the write entry is determined to be unneeded. The write entry is considered to be needed if the remote mirroring logic is still in the process of updating one or more mirror images based upon the corresponding write request, or if there are no fractured secondary images, and is considered to be unneeded if the remote mirroring logic has updated the images based upon the corresponding write request.

Therefore, beginning in step 321, the remote mirroring logic determines whether there is an untested write entry in the write intent log, in step 323. If all write entries in the write intent log have been tested (NO as part of step 323), then the remote mirroring logic for removing write entries from the write intent log terminates in step 325. However, if there is an untested write entry in the write intent log, i.e., step 323, then the remote mirroring logic proceeds to determine whether there is a fractured secondary image at step 327.

A fractured secondary, as appreciated from the previous description, can occur as a result of a failed secondary storage unit, a link failure to the secondary storage unit, or a software fracture. The persistent fracture log previously described can be used if there is a fractured secondary as determined by step 327 to update the secondary storage unit at which point then it returns to step 323 to determine if there is an untested write entry and proceeds as before. If there is no fractured secondary as determined by the answer NO at step 327, then at step 329 it is determined if the write entry is unneeded. If the answer is "no" then at step 331 the write entry is removed from the write entry log. If the answer is that the write entry is still needed, then the process returns back to step 323 and repeats.

During operation of the mirror, it is possible for the primary image to fail. The primary image can fail due to a SP failure, a communication failure, or a media failure. When the primary image fails, the mirror cannot be accessed until either the primary image is repaired or a secondary image is promoted to operate as a primary image as described above. Furthermore, failure of the primary while a secondary synchronization operation is taking place leaves the secondary's state unchanged from what it was when the synchronization operation started.

As mentioned previously, an SP failure can cause a primary image failure. An SP failure in a primary storage unit that has a single SP results in an outright failure of the primary image. However, failure of one SP in a primary storage unit that has two SPs does not prevent the primary storage unit from operating in the mirror, since the remaining SP is able to assume management and control of the primary image so that the mirror can continue operating as usual but without the security of a backup SP.

Therefore, when the controlling SP in the primary storage unit fails, the non-controlling SP assumes the primary image. At the time of the failure, the write operations corresponding to any write entries in the write intent log may be at different points of completion. For example, the remote mirroring logic 105 may not have updated any image, may have updated the primary image but no secondary image, may have updated the primary image and some of the secondary images, or may have updated the primary image and all of the secondary images for any particular write operation. However, because the write intent log from the primary SP is replicated on the secondary SP, the secondary SP is able to resynchronize the secondary images using the replicated write intent log. Specifically, rather than copying the entire primary image to each of the secondary storage units, the remote mirroring logic determines any portions of the secondary images that may be unsynchronized based upon the blocks in the primary image identified by the bitmap in the write intent log as possibly having write entries, and then resynchronizes only those portions of the secondary images that may be unsynchronized, preferably by copying only those image blocks that may be unsynchronized.

On the other hand, if the primary storage unit fails, the automatic backup/restoral logic 109 automatically stores the write intent log in the disk array 29.

Figure 10:
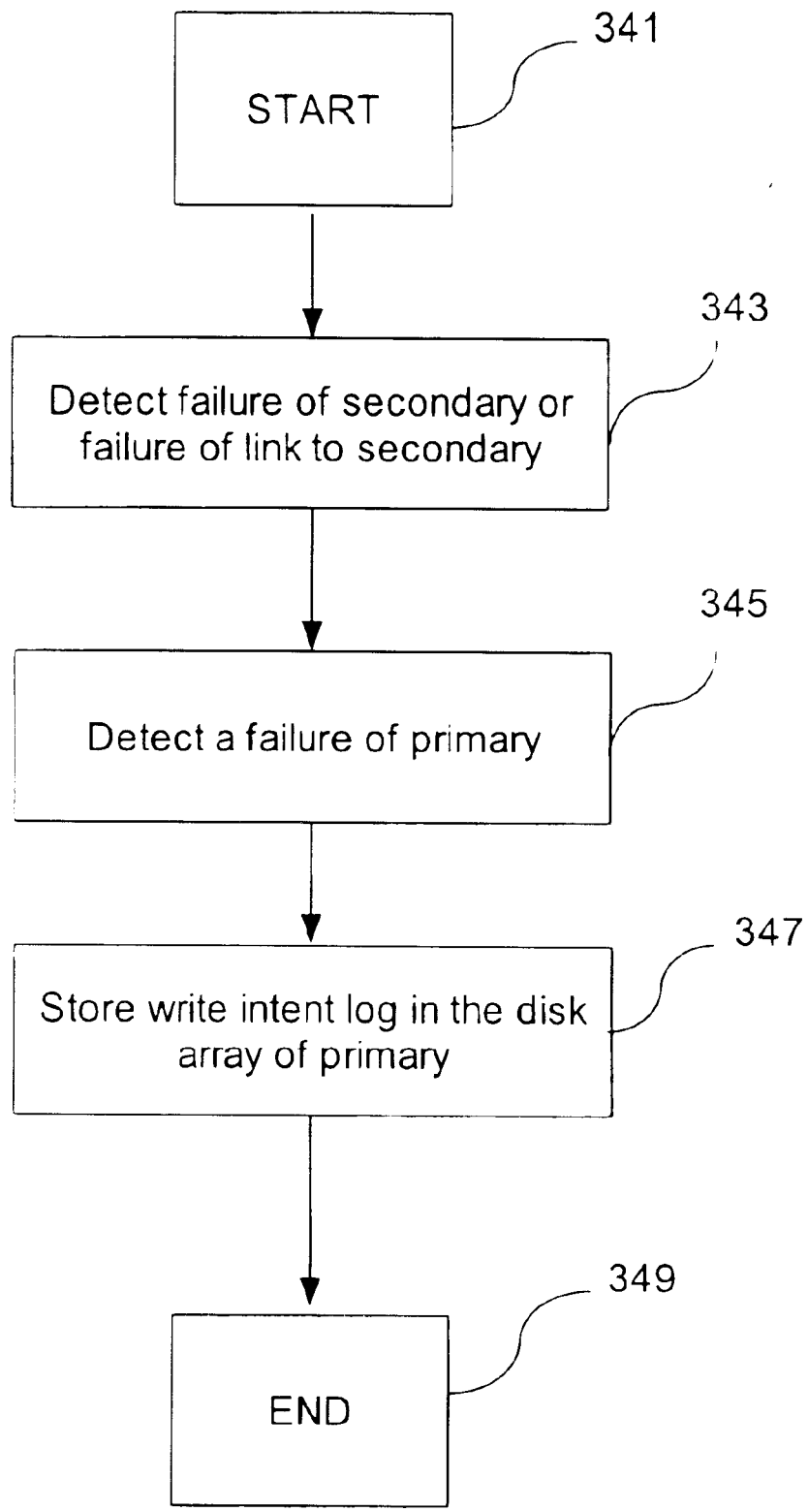
FIG. 10 is a logic flow diagram showing exemplary logic for automatically recovering based on a write intent log created in non-volatile storage, upon detecting a failure to write to the primary image.

FIG. 10 is a logic flow diagram showing exemplary automatic backup/restoral logic. Beginning in step 341, and upon detecting a failure of secondary or of a link to the secondary, in step 343, the persistent fracture log is implemented to provide eventual synchronization of the secondary with the primary image as previously discussed with reference to FIG. 7 in particular. At step 345 if there is detected a failure of the primary storage unit, in particular a SP failure of the primary, the automatic backup/restoral logic 109 stores the write intent log in the disk array 29, in step 347, and terminates in step 349.

In one embodiment the primary storage unit includes battery backup capabilities, allowing the automatic backup/restoral logic 109 to store the write intent log in the disk array 29 even in the case of a power failure. Furthermore, the automatic backup/restoral logic 109 actually stores multiple copies of the write intent log in the disk array 29 so that the write intent log can be recovered in case of a partial disk failure.

At the time of the failure, the write operations and blocks identified by the bitmap in the write intent log may be at different points of completion, or represent unsynchronized data to a fractured secondary image.

Once the primary storage unit is in operation following a failure, the primary SP (which may be either the primary SP or the secondary SP from prior to the failure), and particularly the automatic backup/restoral logic 109, restores the write intent log from the disk array 29. The remote mirroring logic 105 may then be instructed to resynchronize the secondary images. Rather than copying the entire primary image to each of the secondary storage units, the remote mirroring logic 105 determines any portions of the secondary images that may be unsynchronized based upon the write entries in the write intent log, and then resynchronizes only those portions of the secondary images that may be unsynchronized, preferably by copying only those image blocks that may be unsynchronized.

If the failure is connection to a secondary image, software related thereto, or the secondary storage unit processor, and a persistent fracture log, for example, fracture log 241, has been established, upon restoring of the secondary unit, the fracture log can be used to identify and allow copying only of those image blocks that may unsynchronized.

Figure 11:
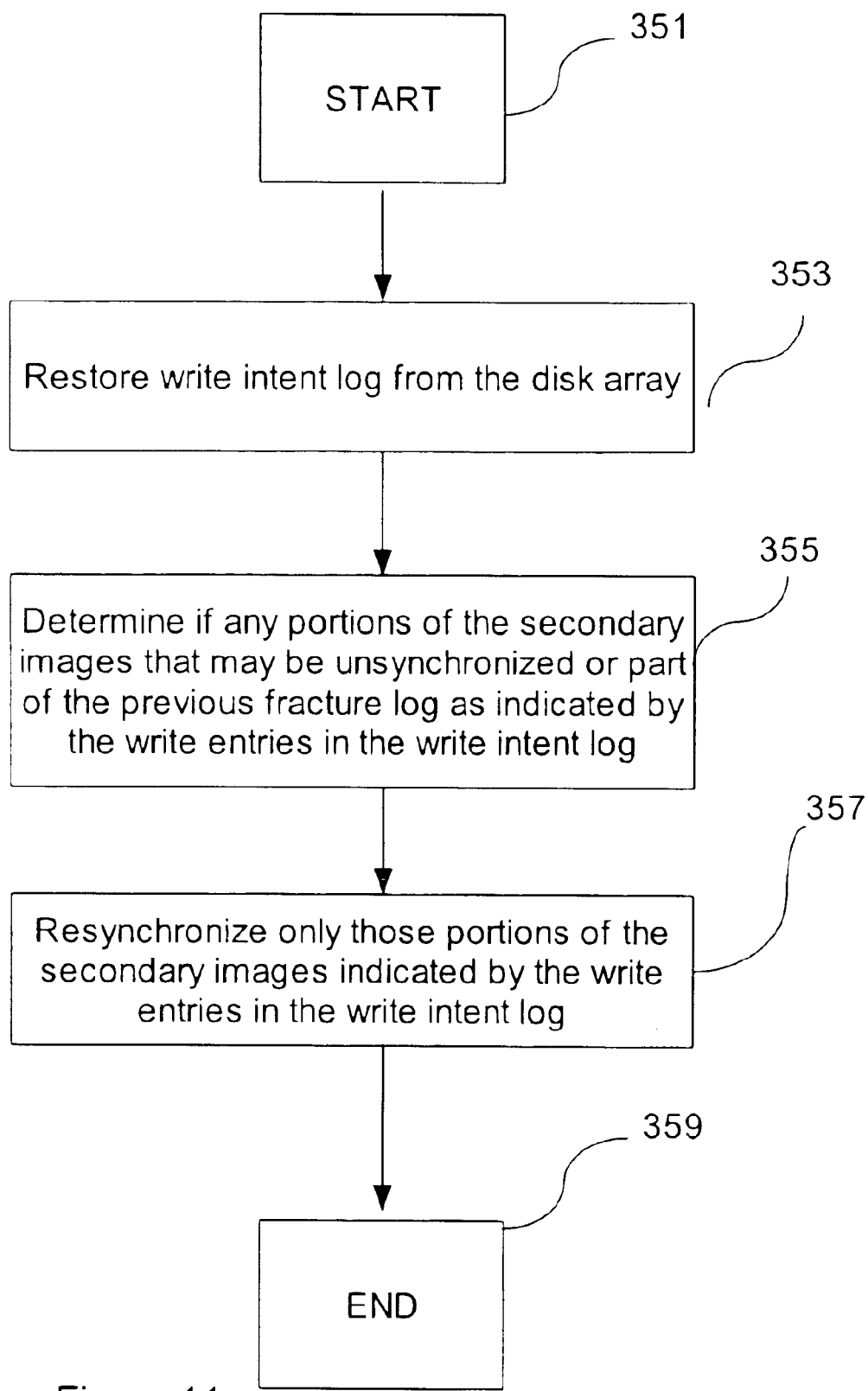
FIG. 11 is a logic flow diagram showing the exemplary logic for resynchronizing the primary and secondary images following a failure in accordance with the system described herein.

FIG. 11 is a logic flow diagram showing exemplary logic for resynchronizing the secondary images following a failure in the primary storage unit or in the secondary storage unit. Beginning in step 351, the logic first restores the write intent log from the disk array 29, in step 353. The logic then determines any portions of the secondary images or part of the previous fracture log which may be unsynchronized as indicated by the write entries in the write intent log, in step 355, and resynchronizes only those portions of the secondary images indicated by the write entries in the write intent log, in step 357. The logic terminates in step 359.

In a preferred embodiment of the present invention, predominantly all of the logic for maintaining the write intent log and the persistent fracture log, and utilizing both logs to resynchronize the secondary images following a failure in the primary storage unit or failure to synchronize the secondary storage unit, is implemented as a set of computer program instructions that are stored in a computer readable medium and executed by an embedded microprocessor system within the primary storage unit, and more particularly within a storage processor running in the primary storage unit. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as—a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for synchronizing a plurality of data images in a computer system. The plurality of data images include a primary image and at least one secondary image. The method involves maintaining a fracture log reflecting what changes have been made in a primary storage unit array as a result of a write request. If the write operation does not occur at the secondary unit, when restored the fracture log is used to identify the changed block on the primary unit and they are then copied to the secondary unit to synchronize the secondary unit. In addition, a write intent log is also maintained identifying any portions of the plurality of data images that may be unsynchronized and resynchronizing only those portions of the plurality of data images that may be unsynchronized. Maintaining the write intent log involves receiving a write request and storing in the write intent log a bitmap made up of information derived from the write request, which identifies at least the blocks on the primary image on which a write operation may have been conducted. The information derived from the write request, as noted, may be a block identifier identifying an image block that may be unsynchronized or write update information indicating one or more modifications to the plurality of data images. Maintaining the write intent log also involves synchronizing the primary image and the secondary image based upon the write request irrespective of whether or not the write operation at the primary image occurred. The at least one secondary image is updated based upon the write request by copying the identified blocks on the primary image to the secondary image, and removing the write entry from the write intent log after synchronizing the primary image and the at least one secondary image to correspond to the write request, irrespective of whether it was effectuated. Maintaining the log may also involve writing the log to a non-volatile storage upon detecting a failure and restoring the log from the non-volatile storage upon recovery from the failure. Resynchronizing only those portions of the plurality of data images that may be synchronized involves copying only those portions of the primary image to the at least one secondary image. In a preferred embodiment of the present invention, the bitmap in the log identifies a number of image blocks that may be unsynchronized, in which case resynchronizing only those portions of the plurality of data images that may be unsynchronized involves copying only these image blocks that may be unsynchronized from the primary image to the at least one secondary image.

This present invention may also be embodied as an apparatus maintaining a plurality of data images in a computer system, the plurality of data images include a primary image and at least one secondary image. The apparatus includes at least a non-volatile storage for storing at least the primary image, a network interface for accessing the at least one secondary image, a persistent fracture log to track changes made to a primary image which may not have been made on a secondary image, a write intent log for indicating any portions of the at least one secondary image that may be unsynchronized, and remote mirroring logic for maintaining the plurality of data images. The remote mirroring logic includes, among other things, resynchronization logic for resynchronizing the at least one secondary image to the primary image following a failure by resynchronizing only those portions of the at least one secondary image that may be unsynchronized as reflected with the fracture log or as indicated by the write intent log. The remote mirroring logic also includes receiving logic operable coupled to receive a write request from a host and log maintenance logic operably coupled to store in the write intent log a bitmap representative of a block on which a write entry may have occurred, and including information derived from the write request. The information derived from the bitmap may be a block identifier identifying an image block that may be unsynchronized or write update information indicating one or more modifications to the plurality of data images. The remote mirroring logic also includes primary image updating logic for updating the primary image based upon the write request and secondary image updating logic for updating the at least one secondary image based upon the write request. The log maintenance logic removes the write entry from the write intent log after updating the primary image and the at least one secondary image based upon the write request, preferably using a "lazy" deletion technique. The apparatus may also include automatic backup/restoral logic for storing the write intent log in the non-volatile storage upon detecting a failure and restoring the write intent log from the non-volatile storage upon recovery from the failure. The resynchronization logic copies only those portions of the primary image that may be unsynchronized to the at least one secondary image. In a preferred embodiment of the present invention, the write intent log identifies a number of image blocks that may be unsynchronized, in which case the resynchronization logic copies only those image blocks that may be unsynchronized from the primary image to the at least one secondary image.

The present invention may also be embodied in computer program for maintaining a plurality of data images in a computer system. The plurality of data images include a primary image and at least one secondary image. The computer program includes disk management logic providing an interface to a non-volatile storage for storing at least the primary image and to a network interface for accessing the at least one secondary image, and remote mirroring logic for maintaining the plurality of data images. The remote Mirroring logic includes log maintenance logic programmed to maintain a write intent log indicating any portions of the at least one secondary image that may be unsynchronized and resynchronization logic programmed to resynchronize the at least one secondary image to the primary image following a failure by resynchronizing only those portions of the at least one secondary image that may be unsynchronized as indicated by the write intent log. The remote mirroring logic also includes receiving logic operably coupled to receive a write request from a host, in which case the log maintenance logic is programmed to store in the fracture log a bitmap representing changes made on a primary image, and in the write intent log a write entry including information derived from the write request. The information derived from the write request may be a block identifier identifying an image block that may be unsynchronized or write update information indicating one or more modifications to the plurality of data images. The fracture log, as noted, is a bitmap. The remote mirroring logic also includes primary image updating logic for updating the primary image based upon the write request and secondary image updating logic for updating the at least one secondary image based upon the write request. The log maintenance logic is programmed to remove the bitmap from the fracture log and the write entry from the write intent log after updating the primary image and the at least one secondary image based upon the write request, preferably using a "lazy' deletion technique. The computer program may also include automatic backup/restoral logic for storing the fracture log and the write intent log in the non-volatile storage via the disk management logic upon detecting a failure and restoring the write intent log from the nonvolatile storage via the disk management logic upon recovery from the failure. The resynchronization logic copies only those portions of the primary image that may be unsynchronized to the at least one secondary image via the disk management logic. In a preferred embodiment of the present invention, the write intent log and fracture log identify a number of image blocks that may be unsynchronized, in which case the resynchronization logic copies only those image blocks that may be unsynchronized from the primary image to the at least one secondary image via the disk management logic.

The present invention may also be embodied as a computer system having a primary storage unit for maintaining a primary image and at least one secondary storage unit for maintaining a secondary image. The primary storage unit maintains a log identifying any portions of the secondary image that may be unsynchronized, and copies from the primary image to the at least one secondary storage unit only those portions of the primary image identified in the log. The secondary storage unit updates the secondary image to include only those portions of the primary image copied from the primary image in order to synchronize the secondary image to the primary image.

The present invention may be embodied in other specific forms without departing from the essence, or essential characteristics. The described embodiments are to be considered in all respects only as illustrative and not restrictive.

What is claimed is:

1. A method for synchronizing a plurality of data images in a computer system, the plurality of data images including a primary image and at least one secondary image, the method comprising:

receiving a write request from a host computer at a primary image site and at a secondary image site;

writing to the primary image at the primary image site and attempting to write to the at least one secondary image at the at least one secondary image site; and in the event the write attempt to the at least one secondary image fails, creating a fracture log made up of a bitmap of the changed regions that have been effected on at least one disk containing the primary image at the primary image site, and which is representative of the blocks on the primary image which have changed at the primary image site, whereby the log can be used to synchronize the primary image and the secondary image.

2. The method of claim 1, wherein said fracture log comprises a bitmap identifying the changed regions on at least one disk that has been written to.

3. The method of claim 1, conducted in synchronous mirroring operations.

4. The method of claim 1, further comprising simultaneously updating the primary image at the primary image site and the at least one secondary image at the at least one secondary image site in response to a write request, and communicating to the host that the update to the primary image at the primary image site and the at least one secondary image at the at least one secondary image site is complete, whereby the fracture log is not created.

5. The method of claim 1, wherein: if the write request to the at least one secondary image site fails; the fracture log representative of changed regions is created at the primary image site and is representative of changed regions in the image at the primary image site; and the fracture log at the primary image site is used to effect writing to the at least one secondary image at the at least one secondary image site when it becomes possible to write to the at least one secondary image site, to ensure that the images at the primary image site and at the at least one secondary image site are synchronized.

6. The method of claim 1, further comprising erasing the fracture log once writing to the at least one secondary image occurs.

7. The method of claim 5, further comprising erasing the fracture log once writing to the primary image and to the at least one secondary image occurs.

8. The method of claim 4, wherein the write request fails at the primary image site, and further comprising creating a write intent log which identifies blocks at the primary image site to which writing may have occurred, for writing of the identified blocks to at least one secondary image, when writing to the primary image site is restored, and in the event writing to the at least one secondary image is not possible, for creating said fracture log at the primary image site for effecting said write request on the at least one secondary image when writing to the at least one secondary image is restored.

9. The method of claim 1, wherein said primary image site and said secondary image site comprise storage arrays.

10. The method of claim 1, wherein said host computer is a server, connected through a network comprising a plurality of storage arrays comprised of multiple storage disks, for controlling the operation of the storage arrays.

11. The method of claim 1, wherein said synchronizing of data images at the primary image site and at the secondary image site is conducted to allow the computer system to operate in the event one of the primary image sites and the secondary image site fails.

12. A computer system for maintaining a plurality of data images in the computer system, the plurality of data images including a primary image and at least one secondary image, the computer system comprising:

non-volatile storage for storing at least the primary image;

a network interface for accessing the at least one secondary image;

logic for creating a fracture log made up of a bitmap of the changed regions that have been effected on at least one disk containing the primary image, and which is representative of the blocks on the primary image which have changed at the primary image site as a result of a write to the primary image, and for creating the fracture log only if a write request to a primary image and at least one secondary image fails with respect to the secondary image failure; and write logic for writing to the primary image and to the at least one secondary image to maintain the primary image and the at least one secondary image synchronized, and for writing to the at least one secondary image based on the contents of the fracture log upon the failure of a write request to the at least one secondary image.

13. The computer system of claim 12, wherein said fracture log comprises a bitmap identifying the changed regions on at least one disk that have been effected.

14. The computer system of claim 12, wherein said logic for creating a fracture log is located at a primary image site in which the primary image is maintained, and said write logic is configured for updating the primary image at the primary image site and the at least one secondary image at least one secondary image site, and for communicating to a host issuing the write request that the update to the primary image at the primary image site, and the at least one secondary image at the at least one secondary image site is complete.

15. The computer system of claim 12, wherein the write logic is configured for using a created fracture log, in the event of a failure upon a write request to write to the at least one secondary image, to write the same changes to the at least one secondary image upon the ability to write being restored, as previously written to the primary image to ensure synchronization between the primary image and the at least one secondary image.

16. The computer system of claim 12, wherein said write logic is configured for erasing the fracture log once writing to the primary image and to the at least one secondary image occurs.

17. The computer system of claim 14, wherein said write logic is configured for erasing the fracture log once writing to the primary image and to the at least one secondary image occurs.

18. The computer system of claim 14, further comprising:
a write intent log in the primary image for identifying regions in the primary image possibly affected by a write request irrespective of whether there was a possible failure to write to the primary image in response to a write request; and
said write logic further configured for writing to the secondary image the blocks in the primary image identified by the write intent log as possibly being affected upon the ability to write to the primary image being restored to normal operation.

19. The computer system of claim 12, wherein said primary image site and said at least one secondary image site comprise storage arrays.

20. The computer system of claim 19, further comprising a host server for controlling said storage arrays and for issuing write requests to said storage arrays.

21. The computer system of claim 12, further configured for continuing to operate with current image data in the event of failure of the primary image site.

* * * * *